Sept. 25, 1951 A. M. HANSEN ET AL 2,568,731
INSTRUMENT FOR MEASURING ELASTICITY AND ELASTIC
RECOVERY OF TEXTILE FABRIC
Filed Jan. 7, 1949 2 Sheets-Sheet 1
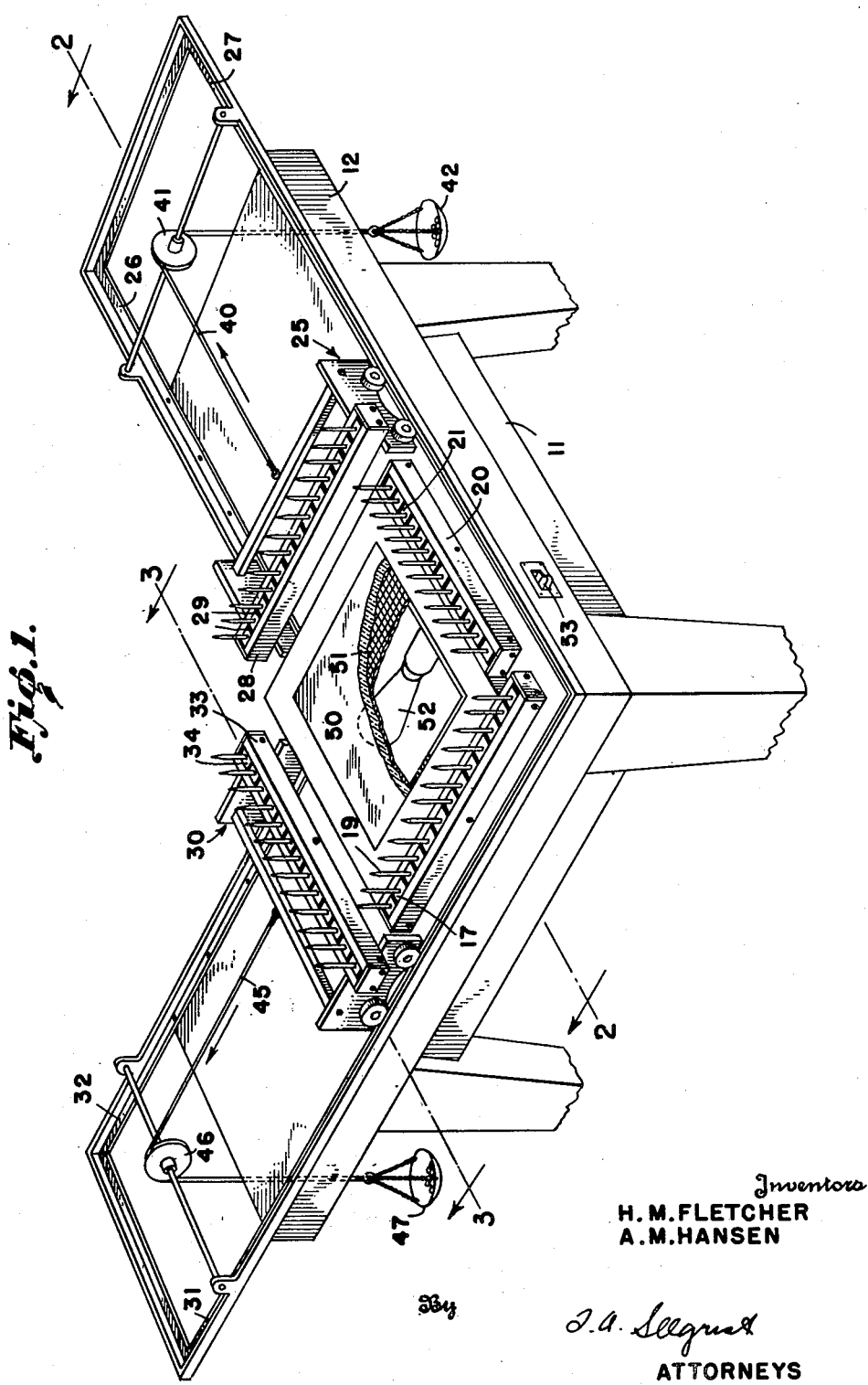
Inventors
H. M. FLETCHER
A. M. HANSEN
By
J. A. Siegrist
ATTORNEYS Sept. 25, 1951  A. M. HANSEN ET AL  2,568,731
INSTRUMENT FOR MEASURING ELASTICITY AND ELASTIC
RECOVERY OF TEXTILE FABRIC
Filed Jan. 7, 1949  2 Sheets-Sheet 2
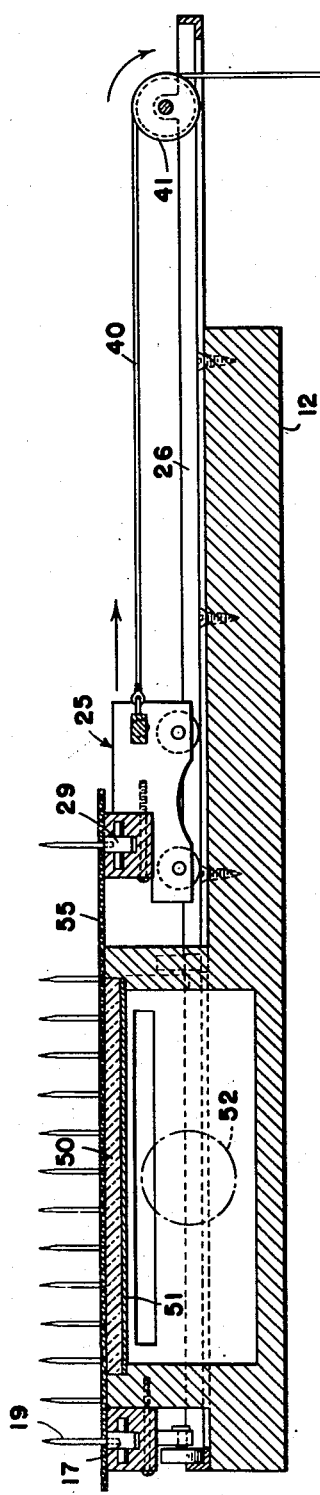
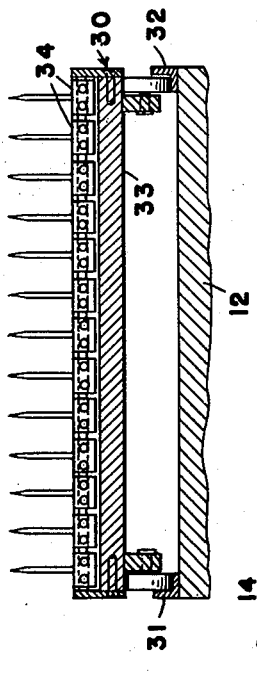
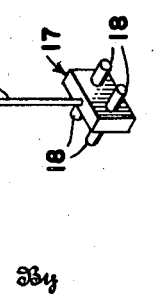
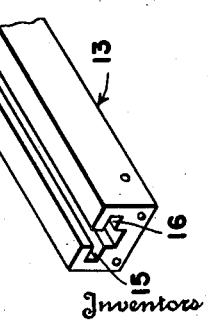
Inventors
H. M. FLETCHER
A. M. HANSEN
By
J. A. Seequist
ATTORNEYS Patented Sept. 25, 1951

2,568,731

UNITED STATES PATENT OFFICE 2,568,731

INSTRUMENT FOR MEASURING ELASTICITY AND ELASTIC RECOVERY OF TEXTILE FABRIC

Arnold M. Hansen, Berwyn, and Hazel M. Fletcher, Hyattsville, Md., dedicated to the free use of the People in the territory of the United States Application January 7, 1949, Serial No. 69,768

1 Claim. (Cl. 73—159)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

We hereby dedicate the invention herein described to the free use of the people in the territory of the United States to take effect on the granting of a patent to us.

This invention relates to a textile fabric testing instrument, and has among its objects the provision of an instrument for testing the elasticity and elastic recovery of a fabric simultaneously in both lengthwise and crosswise directions, and such other objects as will be apparent from the following description and claim.

In general, according to the invention, the instrument is provided with a frame on which is fixedly mounted means for holding a rectangular piece of fabric to be tested along a crosswise edge and a corresponding means for holding the piece along a lengthwise edge. Two carriages are also mounted on the frame, one of which is movable perpendicular to the crosswise edge and the other perpendicular to the lengthwise edge. The first-mentioned carriage has means thereon for holding the piece along the remaining crosswise edge and the second-mentioned carriage a corresponding means for holding the piece along the remaining lengthwise edge. Each of the means for holding the fabric along its edges is so constructed and arranged as to permit the fabric to stretch or recover from stretch along the edges. Means is also provided for applying or releasing a force to each of the carriages in the direction of its movement so that with the piece of fabric mounted for testing, it may be stretched and allowed to recover simultaneously in both crosswise and lengthwise directions, and means is provided for measuring the force. By observing the amount of stretch and recovery, the elasticity and elastic recovery when tension is simultaneously applied in both directions is thus readily determined.

For a detail description of the invention, reference is made to the accompanying drawing, in which—

Figure 1 is a three-dimensional view of the instrument with parts broken away for purpose of illustration and without showing the fabric to be tested;

Figure 2 is a section on the line 2—2 of Figure 1, showing the fabric to be tested;

Figure 3 is a section on the line 3—3 of Figure 1;

Figure 4 is a three-dimensional view of a detail; and

Figure 5 is a three-dimensional view of another detail.

In Figure 1 the instrument is shown resting on a table 11 which may be of any desired height for convenient operation of the instrument.

The instrument itself is provided with a frame 12. The means for holding the piece of fabric along a crosswise edge is in the form of a cylindrical member 13 fixedly mounted on the frame and having a valley 14 with overhanging ledges 15 and 16. Similar segments 17 freely slidably mounted in the valley are each provided with protuberances 18 to fit under the overhanging ledges and with a pin 19 on which a crosswise edge of the fabric is pinned. This construction and arrangement permits stretch and elastic recovery of the fabric along the edge pinned to the segments due to the free sliding of the segments relative to member 13.

The means for holding the piece of fabric along a lengthwise edge is similar to the means just described and comprises a cylindrical member 20 with segments 21 and associated parts.

A carriage 25 is mounted on the frame and is movable on parallel rails 26 and 27 in a direction perpendicular to the crosswise edge pinned on pins 19. This carriage has means for holding the piece of fabric along the remaining crosswise edge, similar to the other fabric-holding means above described, comprising a cylindrical member 28 with segments 29 and associated parts. A second carriage 30 is also mounted on the frame, movable on parallel rails 31 and 32 in a direction perpendicular to the lengthwise edge pinned on pins of segments 21, and has a means for holding the piece of fabric along the remaining lengthwise edge, similar to the fabric-holding means above described, comprising a cylindrical member 33 with segments 34 and associated parts.

Means is provided for applying a predetermined amount of force to each carriage in the direction of its movement. This is accomplished by a flexible cord 40 attached at one end to carriage 25, belted over a suitably mounted pulley 41, and carrying a pan 42 at its other end for receiving selected weights, thus providing means for measuring the force. A similar cord 45, pulley 46 and pan 47 are associated with carriage 30.

A flat, transparent sheet of material, such as a pane of ground glass 50, is mounted on the frame between the four fabric-holding means in the manner illustrated. A sheet 51 of coordinate ruled thin paper is positioned below the glass pane and a light 52, such as an electric bulb controlled by a switch 53, is provided below the ruled paper.

In using the instrument, a rectangular piece of fabric as shown at 55 (Figure 2) is inserted flat on the glass pane with the four edges pinned on the pins of segments 17, 21, 29 and 34, respectively. An initial weight just sufficient to hold the fabric taut without distorting it is placed in each pan. With the light turned on, an area is then marked off on the fabric corresponding to an area of the coordinate paper, the rulings on the paper being visible through the fabric due to the use of the thin paper and the light. Equal weights of any desired amount are then used to apply a predetermined force to the fabric in both directions and the area marked off on the fabric is observed, from which the stretch is calculated. The weights are then simultaneously removed, the initial weights applied, and the area again observed, from which the elastic recovery in both directions is calculated.

It is not essential to use the ground glass, ruled paper and light arrangement for making a determination, since the area on the fabric can be laid off and marked with a rule, and the observations of the stretch and recovery calculated directly from the laid-off area.

Having thus described the invention, what is claimed is:

An instrument for testing the elasticity and elastic recovery of a fabric comprising a frame, means fixedly mounted on the frame for holding a rectangular piece of fabric to be tested along a crosswise edge, means fixedly mounted in the frame for holding the piece of fabric along a lengthwise edge, a carriage mounted on the frame movable perpendicularly relative to the crosswise edge and having means thereon for holding the piece of fabric along the remaining crosswise edge, a second carriage mounted on the frame movable perpendicularly relative to the lengthwise edge and having means thereon for holding the piece of fabric along the remaining lengthwise edge, each of said means for holding the piece of fabric along its edges being so constructed and arranged as to permit stretch and elastic recovery of the fabric along the edges, means for applying or releasing a force to each of said carriages in the direction of its movement, and means for measuring the force, whereby the fabric may be stretched and allowed to recover simultaneously in both its crosswise and lengthwise directions and the elasticity and elastic recovery determined by observing the amount of stretch and recovery.

ARNOLD M. HANSEN.
HAZEL M. FLETCHER.

REFERENCES CITED

The following references are of record in the file of this patent:

UNITED STATES PATENTS

| Number | Name | Date |
| --- | --- | --- |
| 1,110,080 | Shepard | Sept. 8, 1914 |
| 1,211,598 | Lake | Jan. 9, 1917 |